United States Patent Office

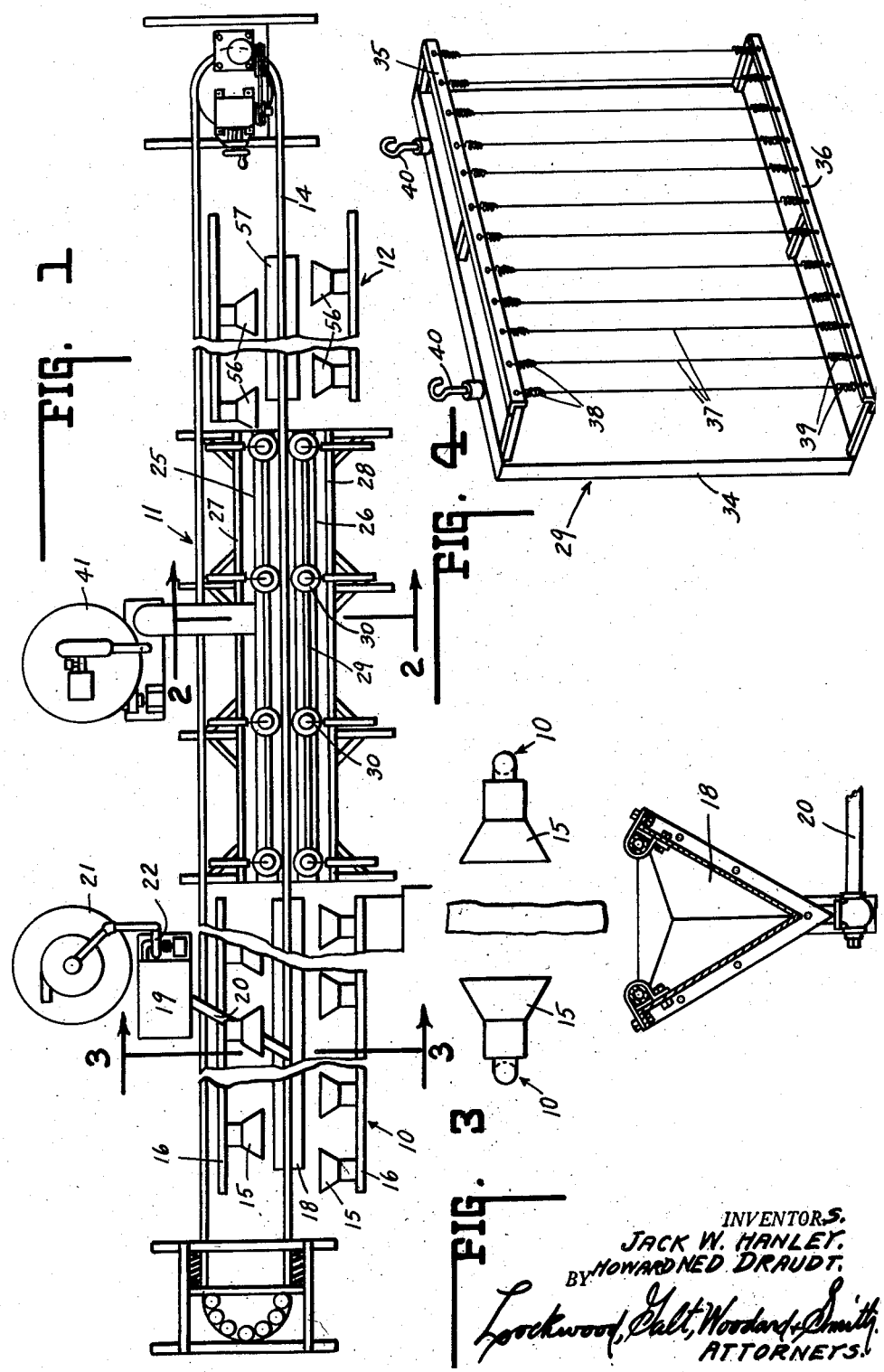

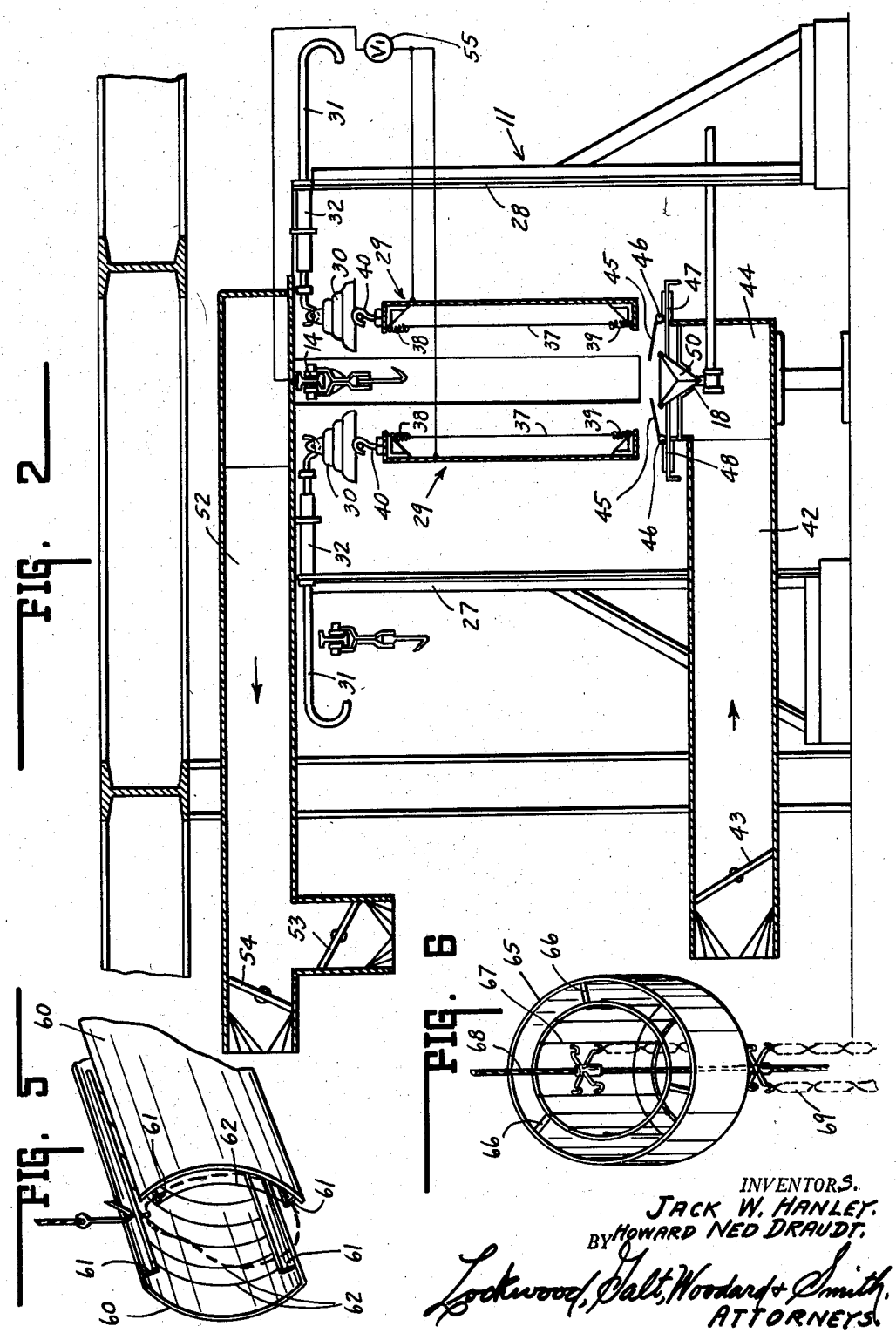

2,844,478
Patented July 22, 1958

2,844,478
PROCESS OF SMOKING MEAT

Jack W. Hanley, Indianapolis, and Howard Ned Draudt, Beech Grove, Ind., assignors to Kingan, Inc., Indianapolis, Ind., a corporation Application January 31, 1955, Serial No. 484,912

6 Claims. (Cl. 99—229)

This invention relates generally to a method of and apparatus for treating meats, and more particularly it relates to an electrostatic smoking process and apparatus.

This application is a continuation-in-part of our original application, Serial No. 385,420 filed October 12, 1953, for Electrostatic Smoking Process and Apparatus.

The conventional method of smoking meats consists in hanging the meat in a smoke house and generating an atmosphere of smoke around the meat until such time as a sufficient quantity of smoke is deposited on the meat. This process requires a substantial number of hours and is somewhat difficult to control to the extent that a uniform product is obtainable.

The principal object of this invention is to provide a method of and apparatus for electrostatically smoking meats, thereby to increase the efficiency of the smoking apparatus and to decrease the time period required for effecting adequate smoking of the meat.

Another object of this invention is to provide a process of smoking meats wherein efficiency is improved by causing a substantially increased percentage of the smoke to come in contact with the meat.

Another object of this invention is to provide electrostatic apparatus adapted to create an electrical field around pieces of meat such that smoke particles are attracted to the outer surfaces of the meat.

Still another object of this invention is to provide a method of and apparatus for completely and continuously processing meats with regard to curing, heating and depositing smoke thereon.

In accordance with this invention there is provided a process of treating meats which comprises injecting a heated curing solution into the meat to give it a predetermined concentration of curing solution, passing the meat through an oven for a predetermined period of time, thereby to raise surface temperatures into a range of 200° F. to 250° F., and to raise internal temperatures of the meat into the range of 115° F. to 130° F., electrostatically smoking said meat for a predetermined period of time, and passing the meat through a second oven to raise its surface temperature into the range of 200° F. to 250° F.

Further in accordance with this invention there is provided apparatus for curing, smoking and drying meats, which comprises a first infra-red oven through which the meat may be passed and heated to a surface temperature within the range of 200° F. to 250° F. and the internal temperature of which may be raised to a range of 115° F. to 130° F., an electrostatic smoking booth arranged in alignment with said oven, including a plurality of ionizing electrodes, arranged in spaced parallel rows between which the meat may be passed, and smoke generating system for passing smoke between said rows of electrodes, a second oven arranged in alignment with said first oven and said electrostatic smoking apparatus for again raising the surface temperature of the meat into the range of 200° F. to 250° F., and a conveyor extending through said ovens and said electrostatic smoking apparatus for continuously conveying pieces of meat through said ovens and said electrostatic smoking apparatus.

In accordance with still another feature of this invention there is provided electrostatic smoking apparatus for smoking meats, which comprises a booth within which are supported parallel rows of ionizing electrodes, a smoke inlet duct arranged beneath said parallel rows of electrodes to discharge smoke into the space between said electrodes, a smoke outlet duct positioned above said electrodes to withdraw the unused smoke, and a conveyor between said parallel rows of electrodes for moving pieces of meat through the space between said electrodes, said conveyor forming an electrode of polarity opposite to that of said ionizing electrodes, whereby meat hanging thereon has identical polarity therewith.

The full nature of the invention will be understood from the accompanying drawings and the following description and claims.

Fig. 1 is a top plan view of series arranged ovens and electrostatic smoking apparatus provided in accordance with this invention.

Fig. 2 is a cross section taken on line 2—2 of Fig. 1 showing a cross section of the electrostatic smoking apparatus.

Fig. 3 is a partial cross sectional view taken on line 3—3 of Fig. 1, and illustrating the smoke inlet duct together with the grease removal apparatus which is disposed beneath the electrostatic smoking apparatus.

Fig. 4 is a perspective view showing the electrode structure illustrated in Figs. 1 and 2.

Fig. 5 is a perspective view showing a modification of the electrode structure illustrated in Fig. 4, especially adapted for the smoking of meat having a bulbous configuration such as ham.

Fig. 6 is a perspective view of still another modification of electrode structure shown in Fig. 4, especially adapted to smoke meat products of elongated form such as that of wieners.

In accordance with this invention there is provided a meat curing, smoking and drying apparatus consisting of a first infra-red oven 10, an electrostatic smoking booth 11 and a second infra-red oven 12, the oven 10, the smoking booth 11 and the oven 12 being arranged in alignment with one another so that an endless conveyor belt 14 may pass through the entire apparatus.

The oven 10 comprises parallel banks of infra-red heating lamps 15 mounted on a suitable wall structure 16. The banks of lamps 15 are spaced from one another a distance sufficient to permit the conveyor belt 14 to pass between them with pieces of meat hanging thereon of various standard sizes. The spacing is a function of product shape and conformation, nature of product, and heat input of the unit lamps. For a product such as bacon, the distance preferably is approximately 27 inches from the face of one bank of heaters to the face of the opposing bank of heaters. In depth or in vertical distance, the heating unit should extend several inches above and below the product hanging on the conveyor 14.

Beneath the oven 10 there is provided a fluid collecting trough 18 for collecting drippings of fat and moisture which are given off by the meat product as it is heated. Trough 18 may be connected to a tank 19 by a duct 20, and a centrifuge 21 may be connected through a pump 22 to tank 19 for separating usable by-products from the fluid drippings.

The electrostatic smoking apparatus in booth 11 consists of parallel rows 25 and 26 of ionizing electrodes suppended from walls 27 and 28, respectively. The row 25 comprises a plurality of ionizing electrode assemblies 29, each of which is hung from a pair of insulators 30 which are in turn hung from adjustable hangers 31 slideably mounted in the tubular members 32. Row 26 is identical to row 25, and detailed description is not necessary.

Each of the electrode assemblies 29 consists of a flat plate member 34 made of conductive material, the upper wire supporting frame 35 of conductive material, the lower wire supporting frame 36 made of conductive material, and the wire electrodes 37 stretched between frames 35 and 36 on tension springs 38 and 39. The assemblies 29 are hung from the insulators 30 by means of hooks 40.

It is found that for most efficient electrostatic smoking of meats, the plate electrodes 34 and the wire electrodes 37 should both be maintained at a voltage within the range of 30,000 to 50,000 volts, 40,000 volts being a preferred voltage. With some types of electrode structures and by varying sizes and portions thereof, the voltage range may be extended from 20,000 to 60,000 volts. The wire electrodes and plate electrodes are connected electrically and maintained at the same voltage. For most efficient operation it is found that both wire electrodes and plate electrodes should be utilized and that sixteen feet of electrode wire per 3.4 square feet of charged plate is necessary to produce maximum results. The maximum effective distance between the ionizing source, which consists of the electrode assembly 29 and the meat being treated, ranges between three and a quarter to eight and a quarter inches. The minimum distance between the ionizing source and the meat is established by the occurrence of arcing between the electrode assembly and the meat. The optimum spacing of the plate 34 and wires 37 is three inches, a greater or lesser spacing decreasing smoke deposition at the same rate in either direction.

For introducing smoke into the space between the rows 25 and 26, there is provided a duct 42 which may be provided with a damper 43 and be connected with a smoke generator 41 of conventional form. Duct 42 leads into a distribution duct 44 extending the length of the booth 11 beneath the rows 25 and 26 of electrodes, thereby to emit smoke into the electrostatic field created by the electrodes. The rate of smoking depends in fact on the velocity of the smoke between the rows of electrodes, the preferred velocity being eighty feet per minute in the space between the rows of electrodes. An operative range of smoke velocity may include forty feet per minute to one hundred and sixty feet per minute. For controlling the velocity of the smoke there are provided adjustable louvers 45 hinged at 46 to the walls of the distribution duct 44. The distribution of smoke within the space between the rows of electrodes may be controlled by independently adjustable louvers 47 and 48 slideably mounted in the walls of the distribution duct 44. Between the louvers 47 and 48 is supported the grease removal trough 50 which is similar to trough 18 in the first oven 10. Louvers 47 and 48 may be moved inwardly or outwardly with respect to trough 50, thereby to pass more or less smoke to either side of trough 50, thereby to control the distribution of smoke on each side of the space between the rows 25 and 26.

For exhausting smoke which is not deposited on the meat product, there is provided an outlet duct system 52 having dampers 53 and 54, whereby smoke may be recirculated through damper 53 to duct 42, or it may be exhausted into the air through damper 54.

For supporting the meat product in the space between the rows of electrodes, there is provided a conveyor system 14 as previously described. The conveyor 14 may be connected to one side of voltage generator 55 while electrode assemblies 29 are connected to the other side of generator 55, thereby to establish ground potential in the meat product being treated. Thus, the 40,000 volt potential on the electrode essemblies 29 has the effect of polarizing the smoke particles and renders them attractive by the new product. Electrode assemblies 29 also serve to confine the smoke to the space around the meat product as it travels between the rows of electrodes. In fact, the ionizing or polarizing action of the electrodes has the visible effect of repeatedly directing the smoke particles into the path intersecting the path of the meat products. In other words, the smoke is visibly attracted to the meat product and repelled from the electrode assemblies 29.

The oven 12 is substantially identical to oven 10 and comprises vertically arranged parallel rows of infra-red lamps 56, together with a grease collecting trough 57 similar in all respects to those associated with oven 10 and smoke booth 11. The oven 12 is intended to raise the surface temperature of the smoked meat into the range of 200° F. to 250° F., thereby to fix the layer of smoke deposited on the meat so that it will not rub off. This operation requires approximately four minutes.

The process of curing, heating and smoking consists in the steps of injecting a solution of salt, water, sugar and sodium nitrite into the meat product, hanging the meat on the conveyor 14 and heating it in the oven 10. The rate of movement of the conveyor 14 and the length of travel within oven 10 are correlated to raise the surface temperature of the meat into the range of 200° F. to 250° F. in a period of approximately four minutes. This surface temperature is reached in the initial zone of travel in oven 10, the remainder of the travel through oven 10 increasing the internal temperature of the meat into the range of 115° F. to 130° F. within a period of twenty-five to forty minutes, depending on the weight and size of the meat product. The second zone of heat described above maintains the outer surface temperature of the meat product within the prevously mentioned range of 200° F. to 250° F.

After heating in oven 10, the product immediately enters the smoking booth 11, the length of which is so correlated to the rate of travel of conveyor 14 that the meat product passes through smoke booth 11 in approximately four minutes. Thus, the smoking process utilizing the electrostatic apparatus previously described requires four minutes as compared to a number of hours in conventional smoking apparatus.

As the meat product leaves smoke booth 11, it enters the oven 12 where the surface temperature of the meat product is raised into the range of 200° F. to 250° F., and the length of oven 12 is so correlated to the speed of conveyor 14 that four minutes is required for the meat product to pass through oven 12. The treatment fixes the layer of smoke on the outer surface of the meat product so that it will not rub off.

The electrode structure illustrated in Figs. 1, 2 and 4 is particularly adapted for the smoking of meat products such as sides of bacon due to the fact that the electrostatic field conforms generally to the configuration of a rectangular and elongated piece of meat. Fig. 5 of the drawings illustrates an electrode structure for forming an electrostatic field corresponding generally in configuration with that of a bulbous meat product such as a ham. There is provided a curved plate electrode 60 which may have a circular cross section or a cross section or other curvature corresponding generally to that of the meat which is to be smoked. Supported from the plate electrode by means of conductive frames 61 are a plurality of conductive wire electrodes 62 having a preformed curvature similar to that of the plate electrodes 60. The electrostatic field created by an electrode structure of this configuration conforms generally to the outer configuration of a ham or a turkey or other fowl.

Fig. 6 of the drawings shows an electrode structure especially adapted for smoking of elongated meat products such as wieners and consists of an outer cylindrical electrode 65 which may be disposed in a vertical plane so that the smoke may be introduced at the bottom of the cylinder to travel upwardly therethrough. Within cylinder 65 and supported from frame 66 are a plurality of wire electrodes 67 arranged concentrically of cylinder 65, thereby to create an electrostatic field having a configuration corresponding generally to that of the particular meat product to be smoked. The meat products may be passed through the electrostatic field by means of a conveyor chain 68 from which wieners 69 may be suspended.

The electrode structure shown in Fig. 5 may be incorporated in the smoking booth illustrated in Fig. 1, but electrode structure shown in Fig. 6 may require a different smoking booth to the extent that the meat products must be conveyed upwardly or downwardly through the cylinder 65. It will be obvious to those skilled in the art as to the arrangement of such a conveyor.

From the foregoing description it will be apparent that this invention provides a method of and apparatus for curing and smoking meats which greatly improves smoking efficiency. The improvement in efficiency is such that the entire curing and smoking process is reduced to a period of thirty-five to sixty minutes as contrasted with hours or days required in prior art methods and apparatus. Furthermore, the process and apparatus of this invention provides a continuous process of curing and smoking which permits meat to be started at one end of the apparatus, piece after piece, and removed piece by piece from the other end of the apparatus in completely cured and smoked condition.

The invention claimed is:

1. The process of curing and smoking meat comprising the steps of injecting a curing solution into said meat, raising the temperature of the surface of said meat within the range of 200° F. to 250° F. over a period of approximately four minutes, holding said surface temperature constant and raising the internal temperature of said meat to the range of 115° F. to 130° F. within a period of twenty-five to forty minutes, creating an electrostatic field of thirty thousand to fifty thousand volts, circulating smoke through said electrostatic field at the rate of forty feet per minute to one hundred sixty feet per minute, passing said meat through said field and smoking said meat for a period of approximately four minutes, and fixing said smoke on the surface of said meat by raising the surface temperature of said meat to the range of 200° F. to 250° F. for a period of approximately four minutes.

2. The process of curing and smoking meat comprising the steps of injecting a curing solution into said meat, raising the temperature of the surface of said meat within the range of 200° F. to 250° F. over a period of approximately four minutes, holding said surface temperature constant and raising the internal temperature of said meat to the range of 115° F. to 130° F. within a period of twenty-five to forty minutes, creating an electrostatic field of thirty thousand to fifty thousand volts, passing said meat through said field and simultaneously smoking said meat for a period of approximately four minutes, and fixing said smoke on the surface of said meat by raising the surface temperature of said meat to the range of 200° F. to 250° F. for a period of approximately four minutes.

3. The process of curing and smoking meat comprising the steps of injecting a curing solution into said meat, raising the temperature of the surface of said meat within the range of 200° F. to 250° F. over a period of approximately four minutes, holding said surface temperature constant and raising the internal temperature of said meat into the range of 115° F. to 130° F. within a period of twenty-five to forty minutes, exposing said meat for a period of approximately four minutes to polarized smoke, and fixing said smoke on the surface of said meat by raising the surface temperature of said meat to the range of 200° F. to 250° F. for a period of approximately four minutes.

4. The process of curing and smoking meat comprising the steps of injecting a curing solution into said meat, raising the temperature of the surface of said meat within the range of 200° F. to 250° F., holding said surface temperature constant and raising the internal temperature of said meat into the range of 115° F. to 130° F., exposing said meat for a period of approximately four minutes to polarized smoke, and fixing said smoke on the surface of said meat by raising the surface temperature of said meat to the range of 200° F. to 250° F. for a period of approximately four minutes.

5. The process of smoking meat comprising the steps of raising the temperature of the surface of said meat within the range of 200° F. to 250° F., exposing said meat for a period of approximately four minutes to ionized smoke, and fixing said smoke on the surface of said meat by raising the surface temperature of said meat to the range of 200° F. to 250° F. for a period of approximately four minutes.

6. The process of smoking meat comprising the steps of creating an electrostatic field of 30,000 volts to 50,000 volts, passing smoke through said field at the rate of 40 feet per minute to 160 feet per minute, passing said meat through said field for a period of approximately four minutes to deposit smoke thereon, and fixing said smoke on the surface of said meat by raising the surface temperature of said meat to the range of 200° F. to 250° F. for a period of approximately four minutes.

References Cited in the file of this patent

UNITED STATES PATENTS

| | | |
|---|---|---|
| 2,461,291 | McKee | Feb. 8, 1949 |
| 2,565,454 | MacKenzie et al. | Aug. 21, 1951 |
| 2,585,799 | Lawrence | Feb. 12, 1952 |